United States Patent
Lee et al.

(10) Patent No.: US 12,180,363 B2
(45) Date of Patent: Dec. 31, 2024

(54) THERMOPLASTIC RESIN COMPOSITION AND ARTICLE PRODUCED THEREFROM

(71) Applicant: LOTTE CHEMICAL CORPORATION, Seoul (KR)

(72) Inventors: Woo Jin Lee, Uiwang-si (KR); Hyuk Jin Jeong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 890 days.

(21) Appl. No.: 17/280,992

(22) PCT Filed: Nov. 18, 2019

(86) PCT No.: PCT/KR2019/015771
§ 371 (c)(1),
(2) Date: Mar. 29, 2021

(87) PCT Pub. No.: WO2020/111618
PCT Pub. Date: Jun. 4, 2020

(65) Prior Publication Data
US 2021/0355318 A1  Nov. 18, 2021

(30) Foreign Application Priority Data
Nov. 26, 2018  (KR) .................. 10-2018-0147560

(51) Int. Cl.
*C08L 69/00*  (2006.01)

(52) U.S. Cl.
CPC ........... *C08L 69/00* (2013.01); *C08L 2201/02* (2013.01); *C08L 2205/035* (2013.01); *C08L 2205/14* (2013.01); *C08L 2207/53* (2013.01)

(58) Field of Classification Search
None
See application file for complete search history.

(56) References Cited

U.S. PATENT DOCUMENTS

| 5,061,745 | A | 10/1991 | Wittmann et al. |
| 2010/0204390 | A1* | 8/2010 | Hayata .................. C08L 69/00 525/450 |
| 2010/0331475 | A1 | 12/2010 | Hong et al. |
| 2013/0289179 | A1* | 10/2013 | Chin ..................... C08K 5/523 524/127 |
| 2014/0155549 | A1 | 6/2014 | Swinnen et al. |
| 2015/0247038 | A1 | 9/2015 | Kim et al. |
| 2017/0044364 | A1 | 2/2017 | Lee et al. |

FOREIGN PATENT DOCUMENTS

| KR | 10-2009-0073978 A | 7/2009 |
| KR | 10-2009-0115608 A | 11/2009 |
| KR | 10-2014-0053172 A | 5/2014 |
| KR | 10-2017-0020668 A | 2/2017 |
| KR | 10-2018-0008823 A | 1/2018 |
| WO | 2020-111618 A1 | 6/2020 |

OTHER PUBLICATIONS

International Search Report in counterpart International Application No. PCT/KR2019/015771 dated Feb. 25, 2020, pp. 1-5.

* cited by examiner

*Primary Examiner* — Michael J Feely
(74) *Attorney, Agent, or Firm* — Additon, Pendleton & Witherspoon, P.A.

(57) ABSTRACT

A thermoplastic resin composition of the present invention comprises: a polycarbonate resin; a large-particle diameter rubber polymer having an average particle size of about 500-3,000 nm; an aromatic vinyl copolymer resin; a core-shell graft copolymer; and a phosphorus flame retardant, wherein the core-shell graft copolymer comprises a shell formed by graft polymerization of epoxy group-containing acrylate monomers to a silicon-based rubber polymer core having an average particle size of about 100-300 nm. The thermoplastic resin composition is excellent in hydrolysis resistance, impact resistance, flame retardancy, heat resistance, fluidity, appearance characteristics, etc.

16 Claims, No Drawings

THERMOPLASTIC RESIN COMPOSITION AND ARTICLE PRODUCED THEREFROM

CROSS-REFERENCE TO RELATED APPLICATIONS

This application claims priority to and the benefit of International Application No. PCT/KR2019/015771, filed Nov. 18, 2019, which published as WO 2020/111618 on Jun. 4, 2020, and Korean Patent Application No. 10-2018-0147560, filed in the Korean Intellectual Property Office on Nov. 26, 2018, the entire disclosure of each of which is incorporated herein by reference.

TECHNICAL FIELD

The present invention relates to a thermoplastic resin composition and an article produced therefrom. More particularly, the present invention relates to a thermoplastic resin composition that exhibits good properties in terms of hydrolysis resistance, impact resistance, flame retardancy, heat resistance, fluidity, and the like, and an article produced therefrom.

BACKGROUND ART

A thermoplastic resin composition comprising a polycarbonate resin, an aromatic vinyl-based resin and a flame retardant has good properties in terms of impact resistance, flame retardancy, processability, and the like to be usefully applied to housings of electric/electronic products and interior and exterior materials for office automation devices.

However, a thermoplastic resin composition comprising a polycarbonate resin is likely to decompose under high temperature and high humidity conditions, causing deterioration in mechanical properties, flame retardancy, and the like while damaging products in severe cases. Thus, for improvement in hydrolysis resistance, the thermoplastic resin composition may comprise polyester resins, such as PET, PBT, PCT, and the like. However, the thermoplastic resin composition containing the polyester resin cannot avoid deterioration in flame retardancy and mechanical properties.

Therefore, there is a need for development of a thermoplastic resin composition having good properties in terms of hydrolysis resistance, impact resistance, flame retardancy, heat resistance, fluidity, and balance therebetween.

The background technique of the present invention is disclosed in U.S. Pat. No. 5,061,745 and the like.

DISCLOSURE

Technical Problem

It is one object of the present invention to provide a thermoplastic resin composition that exhibits good properties in terms of hydrolysis resistance, impact resistance, flame retardancy, heat resistance, fluidity, and the like.

It is another object of the present invention to provide a molded article formed of the thermoplastic resin composition.

The above and other objects of the present invention can be achieved by the present invention described below.

Technical Solution

1. One aspect of the present invention relates to a thermoplastic resin composition. The thermoplastic resin composition comprises: a polycarbonate resin; a large-diameter rubber polymer having an average particle diameter of about 500 nm to about 3,000 nm; an aromatic vinyl copolymer resin; a core-shell graft copolymer; and a phosphorus flame retardant, wherein the core-shell graft copolymer is obtained through graft polymerization of an epoxy group-containing acrylate monomer for a shell to a core formed of a silicone-based rubber polymer having an average particle diameter of about 100 nm to about 300 nm.

2. In Embodiment 1, the thermoplastic resin composition may comprise: about 100 parts by weight of the polycarbonate resin; about 1 to about 20 parts by weight of the large-diameter rubber polymer; about 1 to about 20 parts by weight of the aromatic vinyl copolymer resin; about 1 to about 10 parts by weight of the core-shell graft copolymer; and about 1 to about 20 parts by weight of the phosphorus flame retardant.

3. In Embodiment 1 or 2, the large-diameter rubber polymer and the core-shell graft copolymer may be present in a weight ratio of about 1:0.05 to about 1:5.

4. In Embodiments 1 to 3, the large-diameter rubber polymer may be present in the form of a rubber-modified aromatic vinyl copolymer resin (a mixture of a large-diameter rubber polymer having a dispersed phase and an average particle diameter of about 500 nm to about 3,000 nm and an aromatic vinyl copolymer resin having a continuous phase) prepared through continuous solution polymerization of a rubber polymer having a viscosity of about 40 cPs to about 80 cPs in a 5 wt % styrene solution, an aromatic vinyl monomer, and a monomer copolymerizable with the aromatic vinyl monomer.

5. In Embodiments 1 to 4, the aromatic vinyl copolymer resin may be a polymer of the aromatic vinyl monomer and the monomer copolymerizable with the aromatic vinyl monomer.

6. In Embodiments 1 to 5, the phosphorus flame retardant may comprise at least one of a phosphate compound, a phosphonate compound, a phosphinate compound, a phosphine oxide compound, and a phosphazene compound.

7. In Embodiments 1 to 6, the thermoplastic resin composition may have a notched Izod impact strength of about 50 kgf·cm/cm to about 80 kgf·cm/cm, as measured on a ⅛" thick specimen in accordance with ASTM D256.

8. In Embodiments 1 to 7, the thermoplastic resin composition may have a flame retardancy of V-0 or higher, as measured on a 1.5 mm thick specimen by a UL-94 vertical test method.

9. In Embodiments 1 to 8, the thermoplastic resin composition may have a Vicat softening temperature of about 90° C. to about 120° C., as measured under conditions of a load of 5 kg and 50° C./hr in accordance with ISO R306.

10. In Embodiments 1 to 9, the thermoplastic resin composition may have a spiral flow length of about 300 mm to about 500 mm, as measured after injection molding in a spiral-shaped 2 mm thick mold under conditions of a molding temperature of 260° C., a mold temperature of 60° C., an injection pressure of 1,500 kgf/cm$^2$, and an injection rate of 120 mm/s.

11. In Embodiments 1 to 10, the thermoplastic resin composition may have a flame retardancy of V-0 or higher, as measured on a 1.5 mm thick specimen by a UL-94 vertical test method after the specimen is left under conditions of 80° C. and 90% RH for 48 hours.

12. In Embodiments 1 to 11, the thermoplastic resin composition may have a melt-flow index increase rate of about 300% or less, as calculated according to Equation 1:

Melt-flow index increase rate (%)=((MI$_1$−MI$_0$)/MI$_0$)×100                                    [Equation 1]

where MI$_0$ indicates a melt-flow index of a specimen, as measured under conditions of 230° C. and 3.8 kgf in accordance with ASTM D1238, and MI$_1$ indicates a melt-flow index of the specimen, as measured under conditions of 230° C. and 3.8 kgf in accordance with ASTM D1238 after the specimen is left under conditions of 95° C. and 95% RH for 168 hours.

13. Another aspect of the present invention relates to a molded article. The molded article is formed of the thermoplastic resin composition according to any one of Embodiments 1 to 12.

Advantageous Effects

The present invention provides a thermoplastic resin composition that has good properties in terms of hydrolysis resistance, impact resistance, flame retardancy, heat resistance, fluidity, and the like, and a molded article formed of the same.

BEST MODE

Hereinafter, embodiments of the present invention will be described in detail.

A thermoplastic resin composition according to the present invention comprises: (A) a polycarbonate resin; (B) a large-diameter rubber polymer; (C) an aromatic vinyl copolymer resin; (D) a core-shell graft copolymer; and (E) a phosphorus flame retardant.

As used herein to represent a specific numerical range, the expression "a to b" means "≥a and ≤b".

(A) Polycarbonate Resin

The polycarbonate resin according to one embodiment of the invention may comprise any typical polycarbonate resin used in thermoplastic resin compositions. For example, the polycarbonate resin may be an aromatic polycarbonate resin prepared by reacting diphenols (aromatic diol compounds) with a precursor, such as phosgene, halogen formate, or carbonate diester.

In some embodiments, the diphenols may comprise, for example, 4,4′-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis-(3,5-dichloro-4-hydroxyphenyl)propane, without being limited thereto. For example, the diphenols may be 2,2-bis(4-hydroxyphenyl)propane, 2,2-bis (3,5-dichloro-4-hydroxyphenyl)propane, or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyestercarbonate resin obtained by polymerization in the presence of an ester precursor, for example, a bifunctional carboxylic acid.

In some embodiments, the polycarbonate resin may have a weight average molecular weight (Mw) of about 10,000 g/mol to about 100,000 g/mol, for example, about 15,000 g/mol to about 50,000 g/mol, as measured by gel permeation chromatography (GPC). Within this range, the thermoplastic resin composition can have good fluidity (processability). In addition, the polycarbonate resin may be a mixture of at least two polycarbonate resins having different weight average molecular weights.

(B) Large-Diameter Rubber Polymer

The large-diameter rubber polymer according to the embodiment of the invention may have an average particle diameter (D50, volume average) of about 500 nm to about 3,000 nm, for example, about 800 nm to about 2,000 nm. Within this range, the large-diameter rubber polymer can improve hydrolysis resistance, impact resistance, and external appearance of the thermoplastic resin composition together with the core-shell graft copolymer and the like. If the average particle diameter of the large-diameter rubber polymer is less than about 500 nm, the thermoplastic resin composition can suffer from deterioration in impact resistance, and if the average particle diameter of the large-diameter rubber polymer exceeds about 3,000 nm, the thermoplastic resin composition can suffer from deterioration in external appearance.

In some embodiments, the large-diameter rubber polymer may be present in the form of a rubber-modified aromatic vinyl copolymer resin (a mixture of (B) a large-diameter rubber polymer having a dispersed phase and an average particle diameter of about 500 nm to about 3,000 nm and (C) an aromatic vinyl copolymer resin having a continuous phase) prepared through continuous solution polymerization of a rubber polymer having a viscosity of about 40 cPs to about 80 cP, for example, about 45 cPs to about 60 cP, in a 5 wt % styrene solution, an aromatic vinyl monomer, and a monomer copolymerizable with the aromatic vinyl monomer.

In some embodiments, the rubber-modified aromatic vinyl copolymer resin may be prepared by mixing a polymerization initiator and a molecular weight regulator with a mixed solution of the rubber polymer, the aromatic vinyl monomer, the monomer copolymerizable with the aromatic vinyl monomer, and a solvent to prepare a reaction solution; introducing the reaction solution into a first reactor, followed by polymerization to a conversion ratio of about 30% to about 40%; and introducing a polymerized product prepared in the first reactor into a second reactor, followed by polymerization to a conversion ratio of about 70% to about 80%.

In some embodiments, the mixed solution may comprise about 3 wt % to about 15 wt % of the rubber polymer, about 50 wt % to about 85 wt % of the aromatic vinyl monomer and the monomer copolymerizable with the aromatic vinyl monomer, and about 5 wt % to about 30 wt % of the solvent.

In some embodiments, the rubber polymer included in the mixed solution may comprise, for example, diene rubbers (rubber polymers), such as polybutadiene, poly(styrene-butadiene), and poly(acrylonitrile-butadiene); saturated rubbers obtained by adding hydrogen to the diene rubbers; isoprene rubbers; acrylate rubbers (rubber polymers), such as poly(butyl acrylate); and ethylene-propylene-diene terpolymer (EPDM), without being limited thereto. These may be used alone or as a mixture thereof. For example, the rubber polymer may be diene rubbers, specifically, polybutadiene rubbers. In addition, the rubber polymer may have a viscosity of about 40 cPs to about 80 cP, for example, about 45 cPs to about 60 cP, in a 5 wt % styrene solution. Within this range of viscosity in the styrene solution, the large-diameter rubber polymer can be prepared.

In some embodiments, the aromatic vinyl monomer included in the mixed solution may comprise, for example, styrene, α-methylstyrene, β-methylstyrene, p-methylstyrene, methylstyrene, p-t-butylstyrene, ethylstyrene, vinylxylene, monochlorostyrene, dichlorostyrene, dibromostyrene, vinyl naphthalene, and the like. These may be used alone or as a mixture thereof.

In some embodiments, the monomer copolymerizable with the aromatic vinyl monomer included in the mixed solution may comprise, for example, vinyl cyanide monomers, such as acrylonitrile, methacrylonitrile, ethacrylonitrile, phenyl acrylonitrile, α-chloroacrylonitrile, fumaronitrile, and the like. These may be used alone or as a mixture thereof.

In some embodiments, the aromatic vinyl monomer may be present in an amount of about 20 wt % to about 90 wt %, for example, about 30 wt % to about 80 wt %, based on 100 wt % of the aromatic vinyl monomer and the monomer copolymerizable with the aromatic vinyl monomer, and the monomer copolymerizable with the aromatic vinyl monomer may be present in an amount of about 10 wt % to about 80 wt %, for example, about 20 wt % to about 70 wt %, based on 100 wt % of the aromatic vinyl monomer and the monomer copolymerizable with the aromatic vinyl monomer.

In some embodiments, the solvent may be an aromatic organic solvent. For example, ethyl benzene, xylene, or toluene may be used as the solvent. These may be used alone or as a mixture thereof.

In some embodiments, the polymerization initiator may have a half-life of 10 minutes or less at a reactor polymerization temperature and may comprise, for example, radical initiators, such as 1,1-bis(t-butylperoxy)-2-methylcyclohexane, 1,1-bis(t-butylperoxy)cyclohexane, 2-bis(4,4-di-t-butylperoxy cyclohexane)propane, t-hexylperoxy isopropyl monocarbonate, t-butylperoxy maleic acid, t-butylperoxy-3,5,5-trimethylhexanoate, t-butylperoxy laurate, 2,5-dimethyl-2,5-bis(m-toluoylperoxy)hexane, t-butylperoxy isopropyl monocarbonate, t-butylperoxy 2-ethylhexyl monocarbonate, t-hexylperoxy benzoate, 2,5-dimethyl -2,5-bi s(benzoylperoxy)hexane, t-butylperoxy acetate, 2,2-bis(t-butylperoxy)butane, t-butylperoxy benzoate, n-butyl-4,4-bis (t-butylperoxy)valerate, and mixtures thereof. The polymerization initiator may be present in an amount of about 0.007 to about 0.07 parts by weight, for example, about 0.01 to about 0.05 parts by weight, relative to about 100 parts by weight of the mixed solution. Within this range, it is possible to reduce deterioration in appearance characteristics of the thermoplastic resin composition due to remaining polymerization initiator.

In some embodiments, the molecular weight regulator may comprise alkyl mercaptans, such as t-dodecyl mercaptan, n-dodecyl mercaptan, and the like. The molecular weight regulator may be present in an amount of about 0.02 to about 1 part by weight, for example, about 0.03 to about 0.5 parts by weight, relative to about 100 parts by weight of the mixed solution.

In some embodiments, continuous solution polymerization is preferably performed while circulating a refrigerant through a jacket, a coil, or the like, so as to control exothermic reaction that can occur in the reactors during the polymerization process.

In some embodiments, the reaction solution with the polymerization initiator and the molecular weight regulator added thereto may be polymerized to a conversion ratio of about 30% to about 40%, for example, about 32% to about 38%, in the first reactor. Within this range, stable polymerization can be achieved without excessive load of a stirrer.

In some embodiments, a reaction temperature in the first reactor may range from about 60° C. to about 150° C., for example, about 70° C. to about 130° C. Here, the reaction temperature may be varied depending on the type of reactor, stirring rate, the type of polymerization initiator used, and the like.

In some embodiments, a stirring rate in the first reactor may range from about 60 rpm to about 150 rpm, for example, about 80 rpm to about 140 rpm, specifically about 90 rpm to about 130 rpm. Here, the stirring rate may be varied depending on reactor size, the type of polymerization initiator, reaction temperature, and the like. Within this range, the large-diameter rubber polymer can be prepared.

In some embodiments, the polymerized product prepared in the first reactor may be polymerized to a conversion ratio of about 70% to about 80% in the second reactor. Within this range, the large-diameter rubber polymer can be prepared.

In some embodiments, a reaction temperature in the second reactor may range from about 80° C. to about 170° C., for example, about 120° C. to about 160° C. Here, the reaction temperature may be varied depending on the type of reactor, stirring rate, the type of polymerization initiator used, and the like.

In some embodiments, a stirring rate in the second reactor may range from about 50 rpm to about 100 rpm, for example, about 60 rpm to about 95 rpm, specifically about 65 rpm to about 90 rpm. Here, the stirring rate may be varied depending on reactor size, the type of polymerization initiator, reaction temperature, and the like. Within this range, the large-diameter rubber polymer can be prepared.

In some embodiments, continuous solution polymerization may further comprise removing unreacted monomers and a solvent residue by devolatilizing a polymerized product prepared in the second reactor. Here, the devolatilization process may be performed using a devolatilization tank. In one embodiment, the devolatilization process may be performed using a single devolatilization tank. In another embodiment, the devolatilization process may be performed using a first devolatilization tank and a second devolatilization tank vertically connected to each other to remove remaining unreacted material. Through the devolatilization process, the content of residual monomers in the polymerized product may be reduced to about 1,500 ppm or less, for example, about 1,000 ppm or less, specifically about 700 ppm or less.

In some embodiments, the devolatilization tank (devolatilization device) may be a fall-stranding devolatilization tank (DEVO). Here, the angle of a cone of the fall-stranding devolatilization tank is set to minimize a retention time in the devolatilization tank and to effectively transfer a devolatilized product to an underlying gear pump.

In some embodiments, the first devolatilization tank and the second devolatilization tank may be vertically connected to each other to minimize a connection line between the DEVOs. In addition, it is desirable that the first devolatilization tank DV-1 be provided with a control valve or a regulator to regulate pressure thereof.

In some embodiments, the first devolatilization tank may be operated under conditions of a pressure of about 100 torr to about 600 torr, for example, about 200 torr to about 500 torr, a temperature of about 160° C. to about 240° C., for example, about 180° C. to about 220° C., and a retention time of about 10 minutes or less. Within these ranges, reduction in impurities such as remaining monomers and high productivity can be achieved. In addition, the second devolatilization tank may be operated under conditions of a pressure of about 1 torr to about 50 torr, a temperature of about 210° C. to about 250° C., and a retention time of about 10 minutes or less, for example, 5 minutes or less. Within these ranges, the prepared rubber-modified aromatic vinyl copolymer resin can have good properties in terms of color and the like.

In some embodiments, the aromatic vinyl copolymer resin of the rubber-modified aromatic vinyl copolymer resin (the mixture of (B) the large-diameter rubber polymer having a dispersed phase and an average particle diameter of about 500 nm to about 3,000 nm and (C) the aromatic vinyl copolymer resin having a continuous phase) may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength, moldability, and the like.

Here, the aromatic vinyl copolymer of the rubber-modified aromatic vinyl copolymer resin may have the same composition as the aromatic vinyl copolymer resin (C), and the content of the aromatic vinyl copolymer resin (C) of the thermoplastic resin composition may be satisfied by adding a separate (second) aromatic vinyl copolymer resin in addition to the (first) aromatic vinyl copolymer resin of the rubber-modified aromatic vinyl copolymer resin.

In some embodiments, the large-diameter rubber polymer may be present in an amount of about 1 to about 20 parts by weight, for example, about 5 to about 15 parts by weight, relative to about 100 parts by weight of the polycarbonate resin. Within this range, the thermoplastic resin composition can have good properties in terms of hydrolysis resistance, impact resistance, external appearance, and the like.

(C) Aromatic Vinyl Copolymer Resin

The aromatic vinyl copolymer resin according to the embodiment of the invention may be an aromatic vinyl copolymer resin used in a typical rubber-modified vinyl copolymer resin. For example, the aromatic vinyl copolymer resin may be a polymer of a monomer mixture comprising an aromatic vinyl monomer and a monomer copolymerizable with the aromatic vinyl monomer, such as a vinyl cyanide monomer. Here, in the thermoplastic resin composition, the total content of the aromatic vinyl copolymer resin (C) may be satisfied by adding a separate aromatic vinyl copolymer resin in addition to the aromatic vinyl copolymer resin (the mixture of (B) the large-diameter rubber polymer having a dispersed phase and an average particle diameter of about 500 nm to about 3,000 nm and (C) the aromatic vinyl copolymer resin having a continuous phase).

In some embodiments, the separate aromatic vinyl copolymer resin may be obtained by mixing the aromatic vinyl monomer with the monomer copolymerizable with the aromatic vinyl monomer, followed by polymerization, which may be performed by any polymerization method known in the art, such as emulsion polymerization, suspension polymerization, bulk polymerization, and the like.

In some embodiments, the aromatic vinyl monomer may comprise, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 20 wt % to about 90 wt %%, for example, about 30 wt % to about 80 wt %, based on 100 wt % of the aromatic vinyl copolymer resin. Within this range, the thermoplastic resin composition can have good impact resistance, fluidity, and the like.

In some embodiments, the monomer copolymerizable with the aromatic vinyl monomer may be, for example, a vinyl cyanide monomer, such as acrylonitrile, methacrylonitrile, ethacrylonitrile, phenyl acrylonitrile, α-chloroacrylonitrile, fumaronitrile, and the like. These may be used alone or as a mixture thereof. The monomer copolymerizable with the aromatic vinyl monomer may be present in an amount of about 10 wt % to about 80 wt %, for example, about 20 wt % to about 70 wt % based on 100 wt % of the aromatic vinyl copolymer resin. Within this range, the thermoplastic resin composition can have good impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good mechanical strength, moldability, and the like.

In some embodiments, the aromatic vinyl copolymer resin may be present in an amount of about 1 to about 20 parts by weight, for example, about 5 to about 10 parts by weight, relative to about 100 parts by weight of the polycarbonate resin. Within this range, the thermoplastic resin composition can exhibit good properties in terms of impact resistance, fluidity (molding processability), external appearance, and the like.

(D) Core-Shell Graft Copolymer

The core-shell graft copolymer according to the embodiment of the invention is obtained through graft polymerization of an epoxy group-containing acrylate monomer for a shell to a core formed of a silicone-based rubber polymer having an average particle diameter (D50, volume average) of about 100 nm to about 300 nm, for example, about 100 nm to about 200 nm, as measured by a particle size analyzer, and can improve hydrolysis resistance, impact resistance, flame retardancy, and the like of the thermoplastic resin composition together with the large-diameter rubber polymer and the like. Here, polymerization may be performed by any polymerization method known in the art, such as emulsion polymerization, suspension polymerization, and the like. If the average particle diameter of the silicone-based rubber polymer is less than about 100 nm, the thermoplastic resin composition can suffer from deterioration in impact resistance, and if the average particle diameter of the silicone-based rubber polymer exceeds about 300 nm, the thermoplastic resin composition can suffer from deterioration in appearance characteristics and the like.

In some embodiments, the silicone-based rubber polymer may be prepared through polymerization of a rubber monomer comprising a silicone-based monomer such as cyclosiloxane and the like. The cyclosiloxane may comprise, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like. Here, trimethoxymethylsilane, triethoxyphenylsilane, tetramethoxysilane, or tetraethoxysilane may be used as a curing agent. In addition, the silicone-based rubber polymer may be a silicone-based acrylate rubber, such as polydimethylsiloxane/butyl acrylate rubber (PDMS/BA) and the like.

In some embodiments, the epoxy group-containing acrylate monomer forming the shell may be glycidyl methacrylate (GMA), glycidyl acrylate, or the like, For example, glycidyl (meth)acrylate may be used.

In some embodiments, the core-shell graft copolymer may be obtained through graft polymerization of about 50 to about 200 parts by weight, for example, about 60 to about 150 parts by weight, of the shell component, relative to about 100 parts by weight of the rubber polymer (core). Within this range, the thermoplastic resin composition can have good properties in terms of impact resistance, fluidity, flame retardancy, hydrolysis resistance, and the like.

In some embodiments, the core-shell graft copolymer may be present in an amount of about 1 to about 10 parts by weight, for example, about 2 to about 5 parts by weight, relative to about 100 parts by weight of the polycarbonate resin. Within this range, the thermoplastic resin composition can have good properties in terms of hydrolysis resistance, impact resistance, flame retardancy, and the like.

In some embodiments, the large-diameter rubber polymer and the core-shell graft copolymer may be present in a weight ratio of about 1:0.05 to about 1:5, for example, about 1:0.1 to about 1:3, specifically about 1:0.1 to about 1:2. Within this range, the thermoplastic resin composition can have good properties in terms of hydrolysis resistance, impact resistance, fluidity, appearance characteristics, and the like.

(E) Phosphorus Flame Retardant

The phosphorus flame retardant according to the embodiment of the invention may comprise a phosphorus flame retardant used in typical thermoplastic resin compositions. For example, the phosphorus flame retardant may comprise a phosphate compound, a phosphonate compound, a phosphinate compound, a phosphine oxide compound, a phosphazene compound, and a metal salt thereof. These compounds may be used alone or as a mixture thereof.

In some embodiments, the phosphorus flame retardant may comprise an aromatic phosphoric ester compound represented by Formula 1.

[Formula 1]

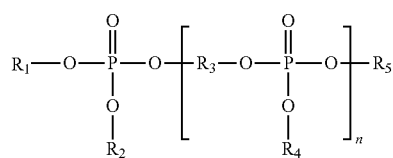

where $R_1$, $R_2$, $R_4$, and $R_5$ are each independently a hydrogen atom, a $C_6$ to $C_{20}$ (6 to 20 carbon atoms) aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer of 0 to 10, for example, 0 to 4.

When n is 0 in Formula 1, examples of the aromatic phosphoric ester compound may comprise diaryl phosphates such as diphenyl phosphate, triphenyl phosphate, tricresyl phosphate, trixylenyl phosphate, tri(2,6-dimethylphenyl) phosphate, tri(2,4,6-trimethylphenyl) phosphate, tri(2,4-di-tert-butylphenyl) phosphate, and tri(2,6-dimethylphenyl) phosphate; and when n is 1 in Formula 1, examples of the aromatic phosphoric ester compound may comprise bisphenol-A bis(diphenyl phosphate), resorcinol bis(diphenyl phosphate), resorcinol bis[bis(2,6-dimethylphenyl)phosphate], resorcinol bis[bis(2,4-di-tert-butylphenyl) phosphate], hydroquinone bis[bis(2,6-dimethylphenyl)phosphate], hydroquinone bis(diphenyl phosphate), and hydroquinone bis[bis(2,4-di-tert-butylphenyl)phosphate], without being limited thereto. These compounds may be used alone or as a mixture thereof.

In some embodiments, the phosphorus flame retardant may be present in an amount of about 1 to about 20 parts by weight, for example, about 8 to about 18 parts by weight, relative to about 100 parts by weight of the polycarbonate resin. Within this range, the thermoplastic resin composition can have good properties in terms of flame retardancy, heat resistance, fluidity, and the like.

The thermoplastic resin composition according to one embodiment of the invention may further comprise additives used for typical thermoplastic resin compositions. Examples of the additives may comprise anti-dripping agents, antioxidants, lubricants, release agents, nucleating agents, stabilizers, antistatic agents, pigments, dyes, and mixtures thereof, without being limited thereto. The additives may be present in an amount of about 0.001 to about 40 parts by weight, for example, about 0.1 to about 10 parts by weight, relative to about 100 parts by weight of the base resin.

The thermoplastic resin composition according to one embodiment of the invention may be prepared in pellet form by mixing the aforementioned components, followed by melt extrusion at about 200° C. to about 280° C., for example, about 220° C. to about 250° C., using a typical twin-screw extruder.

In some embodiments, the thermoplastic resin composition may have a notched Izod impact strength of about 50 kgf·cm/cm to about 80 kgf·cm/cm, for example, about 55 kgf·cm/cm to about 70 kgf·cm/cm, as measured on a ⅛" thick specimen in accordance with ASTM D256.

In some embodiments, the thermoplastic resin composition may have a flame retardancy of V0 or higher, as measured on a 1.5 mm thick specimen by a UL-94 vertical test method.

In some embodiments, the thermoplastic resin composition may have a Vicat softening temperature of about 90° C. to about 120° C., for example, about 100° C. to about 110° C., as measured under conditions of a load of 5 kg and 50° C./hr in accordance with ISO R306.

In some embodiments, the thermoplastic resin composition may have a spiral flow length of about 300 mm to about 500 mm, for example, about 350 mm to about 450 mm, as measured after injection molding in a spiral-shaped 2 mm thick mold under conditions of a molding temperature of 260° C., a mold temperature of 60° C., an injection pressure of 1,500 kgf/cm², and an injection rate of 120 mm/s.

In some embodiments, the thermoplastic resin composition may have a flame retardancy of V-0 or higher, as measured on a 1.5 mm thick specimen by a UL-94 vertical test method after the specimen is left under conditions of 80° C. and 90% RH for 48 hours.

In some embodiments, the thermoplastic resin composition may have a melt-flow index increase rate of about 300% or less, for example, about 150% to about 250%, as calculated according to Equation 1:

Melt-flow index increase rate (%)=(($MI_1$−$MI_0$)/$MI_0$)×100  [Equation 1]

where $MI_0$ indicates a melt-flow index of a specimen, as measured under conditions of 230° C. and 3.8 kgf in accordance with ASTM D1238, and $MI_1$ indicates a melt-flow index of the specimen, as measured under conditions of 230° C. and 3.8 kgf in accordance with ASTM D1238 after the specimen is left under conditions of 95° C. and 95% RH for 168 hours.

A molded article according to the present invention is formed of the thermoplastic resin composition set forth above. The thermoplastic resin composition may be prepared in pellet form. The prepared pellets may be produced into various molded articles (products) by various molding methods, such as injection molding, extrusion molding, vacuum molding, and casting. These molding methods are well known to those skilled in the art. The molded product has good properties in terms of hydrolysis resistance, impact resistance, flame retardancy, heat resistance, fluidity (molding processability), and the like, and thus can be advantageously used for interior/exterior materials for electrical/electronic products, interior/exterior materials for vehicles, exterior materials for buildings, and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Polycarbonate Resin

A bisphenol-A polycarbonate resin (weight average molecular weight (Mw): 27,000 g/mol) was used.

(B) Large-Diameter Rubber Polymer (B1) 8.8 parts by weight of butadiene rubber (BR-2: ASAPRENE 700A) having a viscosity of 45 cPs in a 5 wt % styrene solution was dissolved in a mixed solution consisting of 53.4 parts by weight of a styrene monomer, 17.8 parts by weight of an acrylonitrile monomer, and 20 parts by weight of ethyl benzene as a reaction solvent, followed by adding 0.015 parts by weight of 1,1-bis(t-butylperoxy)cyclohexane as a polymerization initiator and 0.07 parts by weight of t-dodecyl mercaptan as a molecular weight regulator, thereby preparing a mixed solution. The mixed solution was introduced into reactors at a rate of 25 kg/hr. In a first reactor, the mixed solution was stirred at a rate of 130 rpm and subjected to polymerization to a conversion ratio of 35%. In a second reactor, the resulting product prepared in the first reactor was stirred at a rate of 70 rpm and subjected to polymerization to a conversion ratio of 75%, followed by removal of remaining unreacted material through a devolatilization tank, thereby preparing a rubber-modified aromatic vinyl copolymer resin (ABS resin, a mixture of a large-diameter rubber polymer (B1, dispersed phase) and an aromatic vinyl copolymer resin (SAN resin, C1, continuous phase), dispersed phase:continuous phase: 12 wt %:88 wt %) in pellet form. Here, the large-diameter rubber polymer (B1) had an average particle diameter of 1,370 nm and the SAN resin (C1) had a weight average molecular weight of 130,000 g/mol. The average particle diameter of the large-diameter rubber polymer refers to an average particle diameter (D50) measured using a particle size analyzer (Mastersizer S Ver.2.14, Malvern Co., Ltd.).

(B2) A mixture of a rubber-modified aromatic vinyl copolymer resin and an aromatic vinyl copolymer resin was prepared in the same manner as in preparation of (B1), after 5.3 parts by weight of butadiene rubber (BR-2: ASAPRENE 700A) having a viscosity of 45 cPs in a 5 wt % styrene solution and 3.5 parts by weight of styrene butadiene copolymer having a viscosity of 34 cPs in a 5 wt % styrene solution were dissolved in the mixed solution. Here, the large-diameter rubber polymer (B2) had an average particle diameter of 480 nm and the SAN resin (C1) had a weight average molecular weight of 130,000 g/mol.

(B3) A mixture of a rubber-modified aromatic vinyl copolymer resin and an aromatic vinyl copolymer resin was prepared in the same manner as in preparation of (B1), after 4.4 parts by weight of butadiene rubber (BR-1: ASADENE 55AE) having a viscosity of 170 cPs in a 5 wt % styrene solution and 4.4 parts by weight of butadiene rubber (BR-2: ASAPRENE 700A) having a viscosity of 45 cPs in a 5 wt % styrene solution were dissolved in the mixed solution. Here, the large-diameter rubber polymer (B1) had an average particle diameter of 3,690 nm and the SAN resin (C1) had a weight average molecular weight of 130,000 g/mol.

(C) Aromatic Vinyl Copolymer Resin

As an aromatic vinyl copolymer resin added in addition to the SAN resins (C1, C2 and C3), an SAN resin (weight average molecular weight: 130,000 g/mol) prepared through typical suspension polymerization of 75 wt % of styrene and 25 wt % of acrylonitrile was used.

(D) Core-Shell Graft Copolymer (D1) A core-shell graft copolymer (Manufacturer: MRC, Product Name: S2200) obtained through graft polymerization of glycidyl methacrylate (GMA) (shell) to a silicone-based rubber polymer (polydimethylsiloxane/butyl acrylate rubber (PDMS/BA)) (core) having an average particle diameter of 150 nm was used.

(D2) g-ABS obtained through graft polymerization of 55 wt % of styrene and acrylonitrile (shell, weight ratio: 75/25) to 45 wt % of polybutadiene rubber (PBR) (core) having an average particle diameter of 310 nm was used.

(D3) A core-shell graft copolymer (Manufacturer: MRC, Product Name: 52001) obtained through graft polymerization of methyl methacrylate (shell) to a silicone-based rubber polymer (polydimethylsiloxane/butyl acrylate rubber (PDMS/BA)) (core) having an average particle diameter of 150 nm was used.

(E) Phosphorus Flame Retardant

Oligomer type bisphenol-A diphosphate (Manufacturer: Yoke Chemical Co., Ltd., Product Name: YOKE BDP) was used.

Examples 1 to 3 and Comparative Examples 1 to 6

The above components were mixed in amounts as listed in Table 1 and subjected to extrusion under conditions of 230° C., thereby preparing pellets. Here, extrusion was performed using a twin-screw extruder (L/D=36, Φ: 45 mm) and the prepared pellets were dried at 80° C. for 2 hours or more and injection-molded in a 6 oz. injection molding machine (molding temperature: 230° C., mold temperature: 60° C.), thereby preparing specimens. The prepared specimens were evaluated as to the following properties by the following method, and results are shown in Table 2.

Property Measurement (1) Notched Izod impact resistance (kgf·cm/cm): Notched Izod impact strength was measured on a ⅛" thick specimen in accordance with ASTM D256.

(2) Flame retardancy: Flame retardancy was measured on a 1.5 mm thick specimen by a UL-94 vertical test method.

(3) Vicat softening temperature (unit: ° C.): Vicat softening temperature was measured under conditions of a load of 5 kg and 50° C./hr in accordance with ISO R306.

(4) Spiral flow length (unit: mm): Spiral flow length was measured after injection molding in a spiral-shaped 2 mm thick mold under conditions of a molding temperature of 260° C., a mold temperature of 60° C., an injection pressure of 1,500 kgf/cm², and an injection rate of 120 mm/s.

(5) Hydrolysis resistance (Flame retardancy): Flame retardancy was measured on a 1.5 mm thick specimen by a UL-94 vertical test method after the specimen is left under conditions of 80° C. and 90% RH for 48 hours.

(6) Hydrolysis resistance (melt-flow index increase rate): Melt-flow index increase rate (unit: %) was calculated according to Equation 1.

Melt-flow index increase rate (%)=((MI$_1$−MI$_0$)/MI$_0$)×100  [Equation 1]

where MI$_0$ indicates a melt-flow index of a specimen, as measured under conditions of 230° C. and 3.8 kgf in accordance with ASTM D1238, and MI$_1$ indicates a melt-flow index of the specimen, as measured under conditions of 230° C. and 3.8 kgf in accordance with ASTM D1238 after the specimen is left under conditions of 95° C. and 95% RH for 168 hours.

TABLE 1

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| (A) (parts by weight) | 100 | 100 | 100 | 100 | 100 | 100 | 100 | 100 | 100 |
| (B1) (parts by weight) | 5 | 10 | 15 | — | — | 10 | 10 | — | — |
| (B2) (parts by weight) | — | — | — | 10 | — | — | — | — | — |
| (B3) (parts by weight) | — | — | — | — | 10 | — | — | — | — |
| (C) (parts by weight) | 10 | 7 | 5 | 7 | 7 | 7 | 7 | 7 | 7 |
| (D1) (parts by weight) | 5 | 3 | 2 | 3 | 3 | — | — | 3 | — |
| (D2) (parts by weight) | — | — | — | — | — | 3 | — | 3 | 6 |
| (D3) (parts by weight) | — | — | — | — | — | — | 3 | — | — |
| (E) (parts by weight) | 13 | 13 | 13 | 13 | 13 | 13 | 13 | 13 | 13 |
| Notched Izod impact strength (kgf · cm/cm) | 62 | 60 | 61 | 15 | 65 | 13 | 38 | 64 | 18 |
| Flame retardancy (1.5 mm) | V-0 | V-0 | V-0 | V-0 | V-1 | V-1 | V-0 | V-1 | fail |
| Vicat softening temperature (° C.) | 105 | 105 | 105 | 106 | 103 | 104 | 104 | 103 | 104 |
| Spiral flow length (mm) | 410 | 412 | 410 | 510 | 250 | 410 | 410 | 350 | 340 |
| Hydrolysis resistance (Flame retardancy) | V-0 | V-0 | V-0 | V-0 | V-1 | fail | V-0 | fail | fail |
| Melt-flow index increase rate (%) | 200 | 210 | 230 | 210 | 220 | 420 | 340 | 410 | 520 |
| External appearance | ○ | ○ | ○ | ○ | X | ○ | X | X | X |

From the result, it could be seen that the thermoplastic resin compositions according to the present invention had good properties in terms of hydrolysis resistance, impact resistance, flame retardancy, heat resistance, fluidity, and the like.

Conversely, it could be seen that the thermoplastic resin composition of Comparative Example 1 prepared using the large-diameter rubber polymer (B2) having a smaller average particle diameter than the thermoplastic resin compositions according to the invention suffered from deterioration in impact resistance and the like, and the thermoplastic resin composition of Comparative Example 2 prepared using the large-diameter rubber polymer (B3) having a greater average particle diameter than the thermoplastic resin compositions according to the invention suffered from deterioration in appearance characteristics, flame retardancy, and the like. In addition, it could be seen that the thermoplastic resin composition of Comparative Example 3 prepared using g-ABS (D2) instead of the core-shell graft copolymer (D1) suffered from deterioration in impact strength, flame retardancy, hydrolysis resistance, and the like; the thermoplastic resin composition of Comparative Example 4 prepared using the core-shell graft copolymer (D3) instead of the core-shell graft copolymer (D1) suffered from deterioration in impact strength, appearance characteristics, hydrolysis resistance, and the like; the thermoplastic resin composition of Comparative Example 5 prepared using g-ABS (D2) instead of the large-diameter rubber polymer (B1) suffered from deterioration in flame retardancy, hydrolysis resistance, appearance characteristics, and the like; and the thermoplastic resin composition of Comparative Example 6 prepared using g-ABS (D2) alone instead of the large-diameter rubber polymer (B1) and the core-shell graft copolymer (D1) suffered from deterioration in impact resistance, flame retardancy, hydrolysis resistance, appearance characteristics, and the like.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of (A) a polycarbonate resin;
   a rubber-modified aromatic vinyl copolymer resin which is a mixture of (B) a large-diameter rubber polymer as a dispersed phase and having an average particle diameter of about 500 nm to about 3,000 nm and (C1) an aromatic vinyl copolymer resin as a continuous phase;
   (C2) a separate aromatic vinyl copolymer resin;
   about 1 to about 10 parts by weight of (D) a core-shell graft copolymer; and
   about 1 to about 20 parts by weight of (E) a phosphorus flame retardant,
   wherein (D) the core-shell graft copolymer is obtained through graft polymerization of an epoxy group-containing acrylate monomer for a shell to a core formed of a silicone-based rubber polymer having an average particle diameter of about 100 nm to about 300 nm,
   wherein (B) the large-diameter rubber polymer is present in an amount of from about 1 to about 20 parts by weight, wherein (C1) the aromatic vinyl copolymer resin and (C2) the separate aromatic vinyl copolymer resin are present in a combined amount of from about 1 to about 20 parts by weight, and wherein (B) the large-diameter rubber polymer and (D) the core-shell graft copolymer are present in a weight ratio of about 1:0.1 to about 1:3.

2. The thermoplastic resin composition according to claim 1, wherein the rubber-modified aromatic vinyl copolymer resin is prepared through continuous solution polymerization of a rubber polymer having a viscosity of about 40 cPs to about 80 cPs in a 5 wt % styrene solution, an aromatic vinyl monomer, and a monomer copolymerizable with the aromatic vinyl monomer.

3. The thermoplastic resin composition according to claim 1, wherein (C1) the aromatic vinyl copolymer resin and (C2) the separate aromatic vinyl copolymer resin are each a copolymer of an aromatic vinyl monomer and a monomer copolymerizable with the aromatic vinyl monomer.

4. The thermoplastic resin composition according to claim 3, wherein the aromatic vinyl monomer is present in an amount of about 20 wt % to about 90 wt % and the monomer copolymerizable with the aromatic vinyl monomer is present in an amount of about 10 wt % to about 80 wt %, based on 100 wt % of the aromatic vinyl monomer and the monomer copolymerizable with the aromatic vinyl.

5. The thermoplastic resin composition according to claim 3, wherein (C1) the aromatic vinyl copolymer resin and (C2) the separate aromatic vinyl copolymer resin are each a copolymer of an aromatic vinyl monomer and a vinyl cyanide monomer.

6. The thermoplastic resin composition according to claim 5, wherein (C1) the aromatic vinyl copolymer resin and (C2) the separate aromatic vinyl copolymer resin are each a styrene-acrylonitrile copolymer resin.

7. The thermoplastic resin composition according to claim 1, wherein (E) the phosphorus flame retardant comprises a phosphate compound, a phosphonate compound, a phosphinate compound, a phosphine oxide compound, and/or a phosphazene compound.

8. The thermoplastic resin composition according to claim 1, wherein the thermoplastic resin composition has a notched Izod impact strength of about 50 kgf cm/cm to about 80 kgf cm/cm, as measured on a ⅛" thick specimen in accordance with ASTM D256.

9. The thermoplastic resin composition according to claim 1, wherein the thermoplastic resin composition has a flame retardancy of V-0 or higher, as measured on a 1.5 mm thick specimen by a UL-94 vertical test method.

10. The thermoplastic resin composition according to claim 1, wherein the thermoplastic resin composition has a Vicat softening temperature of about 90° C. to about 120°° C., as measured under conditions of a load of 5 kg and 50° C./hr in accordance with ISO R306.

11. The thermoplastic resin composition according to claim 1, wherein the thermoplastic resin composition has a spiral flow length of about 300 mm to about 500 mm, as measured after injection molding in a spiral-shaped 2 mm thick mold under conditions of a molding temperature of 260° C., a mold temperature of 60° C., an injection pressure of 1,500 kgf/cm2, and an injection rate of 120 mm/s.

12. The thermoplastic resin composition according to claim 1, wherein the thermoplastic resin composition has a flame retardancy of V-0 or higher, as measured on a 1.5 mm thick specimen by a UL-94 vertical test method after the specimen is left under conditions of 80° C. and 90% RH for 48 hours.

13. The thermoplastic resin composition according to claim 1, wherein the thermoplastic resin composition has a melt-flow index increase rate of about 300% or less, as calculated according to Equation 1:

$$\text{Melt-flow index increase rate } (\%) = ((MI_1 - MI_0)/MI_0) \times 100 \quad \text{[Equation 1]}$$

where $MI_0$ indicates a melt-flow index of a specimen, as measured under conditions of 230° C. and 3.8 kgf in accordance with ASTM D1238, and MI1 indicates a melt-flow index of the specimen, as measured under conditions of 230° C. and 3.8 kgf in accordance with ASTM D1238 after the specimen is left under conditions of 95° C. and 95% RH for 168 hours.

14. The thermoplastic resin composition according to claim 1, wherein the thermoplastic resin composition has:

a notched Izod impact strength of about 50 kgf-cm/cm to about 80 kgf-cm/cm, as measured on a ⅛" thick specimen in accordance with ASTM D256;

a flame retardancy of V-0 or higher, as measured on a 1.5 mm thick specimen by a UL-94 vertical test method;

a Vicat softening temperature of about 90° C. to about 120° C., as measured under conditions of a load of 5 kg and 50° C./hr in accordance with ISO R306;

a spiral flow length of about 300 mm to about 500 mm, as measured after injection molding in a spiral-shaped 2 mm thick mold under conditions of a molding temperature of 260° C., a mold temperature of 60° C., an injection pressure of 1,500 kgf/cm2 and an injection rate of 120 mm/s;

a flame retardancy of V-0 or higher, as measured on a 1.5 mm thick specimen by a UL-94 vertical test method after the specimen is left under conditions of 80° C. and 90% RH for 48 hours; and a melt-flow index increase rate of about 300% or less, as calculated according to Equation 1:

$$\text{Melt-flow index increase rate } (\%) = ((MI_1 - MI_0)/MI_0) \times 100 \quad \text{[Equation 1]}$$

where $MI_0$ indicates a melt-flow index of a specimen, as measured under conditions of 230° C. and 3.8 kgf in accordance with ASTM D1238, and $MI_1$ indicates a melt-flow index of the specimen, as measured under conditions of 230° C. and 3.8 kgf in accordance with ASTM D1238 after the specimen is left under conditions of 95° C. and 95% RH for 168 hours.

15. The thermoplastic resin composition according to claim 1, wherein (B) the large-diameter rubber polymer and (D) the core-shell graft copolymer are present in a weight ratio of about 1:0.1 to about 1:2.

16. A molded article formed of the thermoplastic resin composition according to claim 1.

* * * * *